(12) United States Patent
Oda et al.

(10) Patent No.: US 6,591,001 B1
(45) Date of Patent: Jul. 8, 2003

(54) IMAGE-INPUT DEVICE

(75) Inventors: Takahiro Oda, Gunma pref. (JP); Yuji Ohta, Gunma pref. (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/425,170

(22) Filed: Oct. 22, 1999

(30) Foreign Application Priority Data

Oct. 26, 1998 (JP) .......................................... 10-303656

(51) Int. Cl.$^7$ ................................................. G06K 9/20
(52) U.S. Cl. ........................... 382/117; 356/71; 348/78; 396/18
(58) Field of Search ............................... 382/117, 118, 382/115; 340/5.53, 5.83; 356/71; 902/3, 6; 345/863; 348/78; 396/18

(56) References Cited

U.S. PATENT DOCUMENTS

| | | | | | |
|---|---|---|---|---|---|
| 4,533,222 A | * | 8/1985 | Ishikawa | .................... | 351/206 |
| 5,901,238 A | * | 5/1999 | Matsushita | .................. | 382/117 |
| 6,027,216 A | * | 2/2000 | Guyton et al. | .............. | 351/200 |
| 6,036,095 A | * | 3/2000 | Seo | ....................... | 235/472.01 |
| 6,398,112 B1 | * | 6/2002 | Li et al. | ................. | 235/462.01 |
| 2001/0000025 A1 | * | 3/2001 | Darrell et al. | ............... | 382/103 |

FOREIGN PATENT DOCUMENTS

| | | | | |
|---|---|---|---|---|
| JP | 50-034031 | 11/1973 | ........... | G03B/17/56 |
| JP | P09-247635 | 9/1997 | ............ | H04N/7/17 |
| JP | P10-005195 | 1/1998 | ............ | A61B/5/117 |
| JP | P10-136241 | 5/1998 | .......... | H04N/5/225 |
| JP | P10-137219 | 5/1998 | ........... | A61B/5/117 |
| WO | WO 97/46980 A1 | * 12/1997 | ............ | G07C/9/00 |

OTHER PUBLICATIONS

In re Dulberg, (CCPA) 129 USPQ 348, May 5, 1961.*

* cited by examiner

Primary Examiner—Brian Werner
(74) Attorney, Agent, or Firm—Junichi Mimura

(57) ABSTRACT

An image-input device includes a camera for capturing an iris pattern, and a personal computer for displaying the captured iris image. The computer has software for registering iris data and for comparing iris data. A half mirror is connected to the camera. The camera is mounted to the display of the computer. The half mirror, which transmits a visible light element and reflects near infrared light, is disposed in front of the display when the camera is connected to the computer. The iris of a user is captured by the camera while the user watches the display of the computer through the half mirror.

8 Claims, 10 Drawing Sheets

IMAGE-INPUT DEVICE

CROSS-REFERENCE TO RELATED APPLICATION

This application claims the priority benefit of Japanese Patent Application No. 10-303656, filed Oct. 26, 1998, the entire subject matter of which is incorporated herein by reference.

BACKGROUND OF THE INVENTION

1. Field of the invention

The invention relates to an image-input device for capturing an image of physical characteristics of a human body, such as that of an iris pattern, for identification.

2. Description of the related art

Conventionally, fingerprints, which show a physical characteristic of the human body, are used to identify individuals. However, in recent years, attention has been focused on some security systems using an image of an iris pattern of the eye as a physical characteristic of the human body for identification. In these systems, an image-input device is used for capturing an iris pattern as image information from an eye and for storing the pattern in a memory of a computer, and then, the individual is identified by his/her iris pattern.

In the related art, the image-input device includes a camera for capturing the iris pattern of a user and a display for displaying the iris pattern which is captured by the camera. When the user's iris pattern is captured, a position of the eye which is the object to be captured is adjusted by the user while the user watches the image of the iris pattern displayed on a screen of the display. To adjust the position, the user moves his/her head to align a center of the iris image, which appears on the screen, with a center of the display, or the user changes an angle of the camera to align them. After the adjustment, the captured iris pattern is transferred as the image information to a security management device. In the security management device, the captured iris pattern is registered if the user's iris pattern has not previously been registered during the current use, or the captured iris pattern is compared with registered iris patterns which are stored in a memory of the security management device. As the result of the comparison, the individual is identified.

However, if the user turns his/her eyes upon the display to adjust the position during the capture, the image of the iris pattern on the screen is tilted from the center of the display because the user's eyes are not facing the camera. On the other hand, if the user turns his/her eyes upon the camera, the user can not confirm whether or not the center of image of his/her iris pattern is aligned to the center of the mark on the screen. That is, it is difficult for the user to adjust the position of the image of his/her iris pattern on the screen by himself or herself.

SUMMARY OF THE INVENTION

One purpose of the invention is to provide an image-input device to capture an image at a desired position.

Another purpose of the invention is to provide an image-input device with which the user can position an image of an iris pattern at a desired location precisely and easily.

To achieve the above-described purposes, the image-input device of the invention has input means for capturing an image of an object, display means which has an edge for displaying the image and optical means, disposed between the input means and the display, for passing a visible light element from the image displayed on the display means, and for reflecting a near infrared light from the object to be input to the input means. Further, the image-input device includes a connector for removably coupling the input means to the edge of the display in a stable condition such that the optical means is disposed between the input means and display means. The input means can easily be removed from the display by loosening the connector.

Furthermore, the image-input device includes a memory, such as a hard disk, which registers an iris pattern, a comparator for comparing the registered iris pattern with a captured iris pattern, and a network access means for allowing access to a network if the captured iris pattern is confirmed to be the registered iris pattern.

Moreover, the image-input device further includes a portable terminal device which has a display, a memory and a random access memory. After the comparison of the captured iris pattern temporarily stored in the RAM and the registered iris pattern data in the memory is performed, it is decided whether or not a predetermined software which is stored in the memory is activated. If it is the first time registration, the captured iris pattern is registered in the memory.

BRIEF DESCRIPTION OF THE DRAWINGS

The invention will be more particularly described with reference to the accompanying drawings, in which.

DETAILED DESCRIPTION OF THE PREFERRED EMBODIMENT

In the following description, an iris pattern input device, which captures an image of an iris pattern, is explained by way of a typical example of an image-input device for capturing a physical characteristic of a human body.

Figure 1:
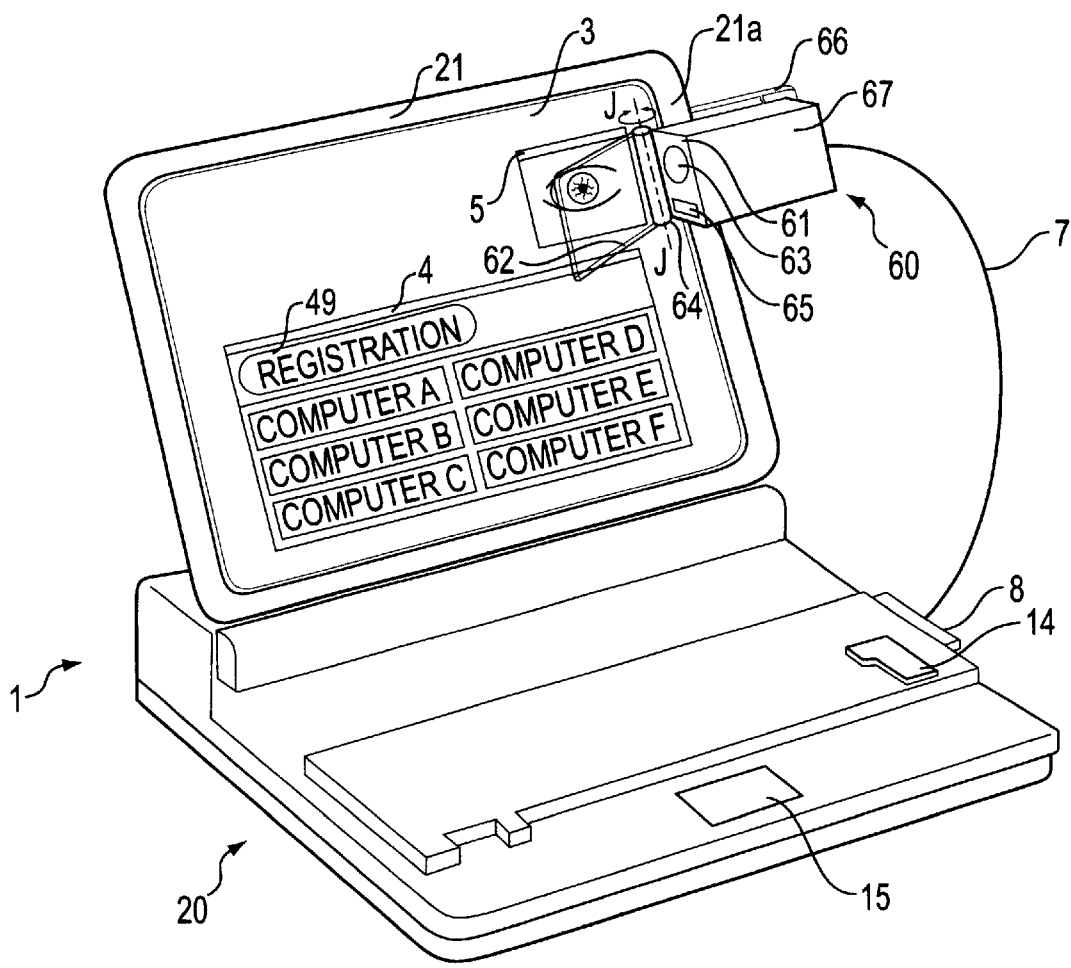
FIG. 1 is a perspective view showing an iris pattern input device of the invention.

Referring to FIG. 1, the iris pattern input device 1 includes a notebook type PC. 20 having a security control device and a display 21 which shows a captured iris pattern, and a capturing camera 60, which is coupled on the display 21 of the PC 20, for capturing the image of the iris pattern.

On a front surface 61 of a camera body 67 of the camera 60, an opening 63 for capturing the image, and a lighting unit 65 are formed. Furthermore, a half mirror 62 is connected to the front surface 61 through a mirror rotating unit 64 which is formed in parallel to the front surface 61 The half mirror 62 can be rotated on an axis j of the mirror rotating unit 64.

The half mirror 62 known as a hot mirror has optical characteristics of reflecting near infrared light only, and transparency to visible light. Therefore, visible light from the display 21 passes through the half mirror 62. Therefore, the near infrared light is reflected to the opening 63 of the camera 60, and visible light from the image of the iris pattern on a screen 3 of the display 21 passes through the half mirror 62. Further, the near infrared light element of the light irradiated from the lighting unit 65 is reflected to the user's eye by the half mirror 62. That is, at the capturing the iris pattern, when the user watches the screen 3 of the display 21 through the half mirror 62, the near infrared light of the user's iris image is only reflected, and then, is led to the opening 63 of the camera 60. Simultaneously, the visual image of the iris pattern on the screen 3 reaches the user's eye because of the transparency of the half mirror 62 to visible light. Also, the near infrared light element of the light irradiated from the lighting unit 65 reaches the user's eye because of the reflection characteristics of the half mirror 62.

A connector 66, such as a clip, is formed on the camera body 67. The camera 60 can be coupled to a screen edge 21a of the display 21 by the connector 66. The camera also can be removed from the screen edge 21a by loosening the connector 66.

Figure 2:
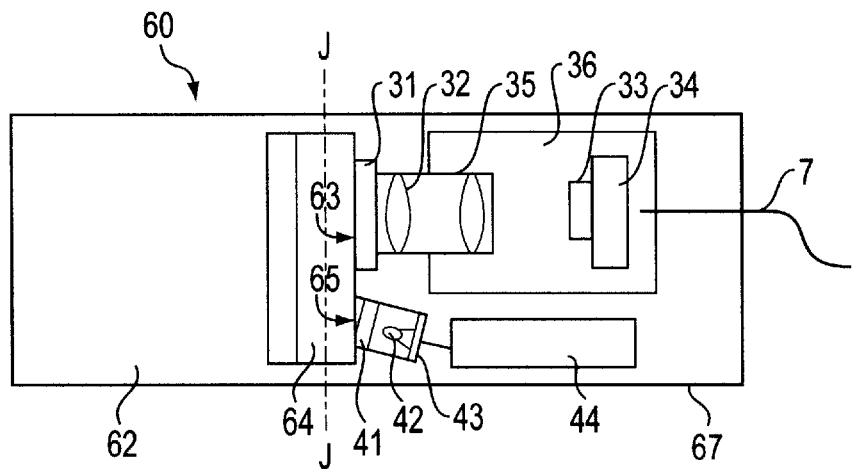
FIG. 2 is a side elevation view showing internal components of a capturing camera.
Figure 3:
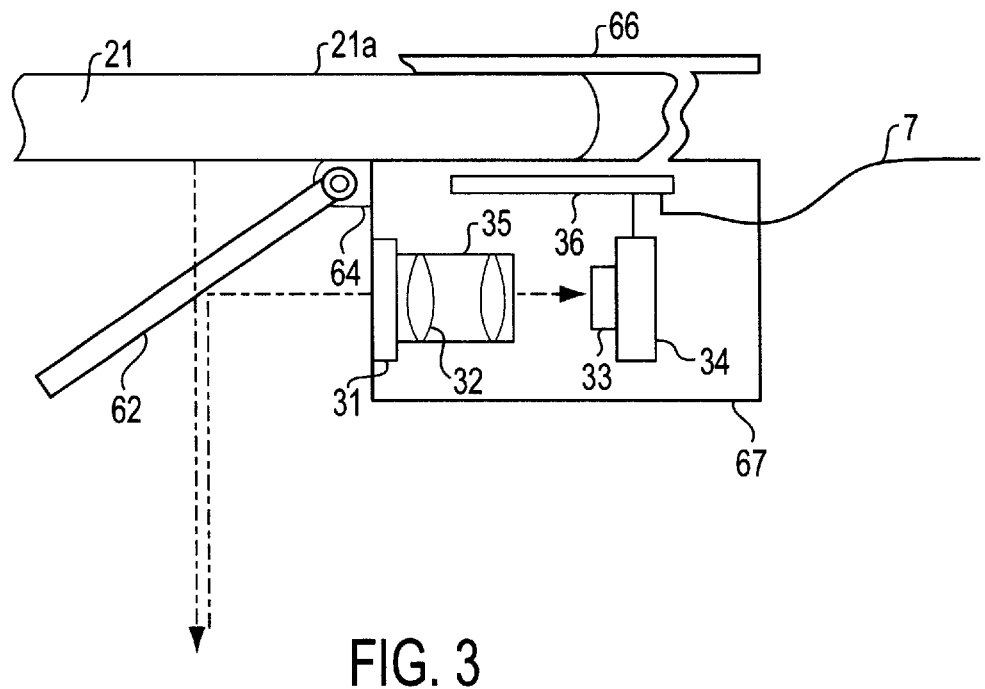
FIG. 3 is a plan view showing internal components of a capturing camera.

Referring to FIGS. 2 and 3, the lighting unit 65 includes a lighting element group 42 composed of three light emitting diodes (LEDs), a substrate 43 for supporting the lighting element group 42, a LED drive circuit 44 for operating the lighting element group 42, and a diffusion glass panel 41 for diffusing light from the lighting element group 42. Within the scope that the image can be captured by the camera 60, the light from the lighting element group 42 is diffused by the diffusion glass panel 41 in condition that a dispersion of the light strength from the lighting element group 42 is held within 10 percent. A lightwave range of the lighting element group 42 is set in the near infrared light range e.g. 700–940 nm in which a bright iris image can easily be reflected. The intensity of light from the lighting element group 42 is set as weak as possible for the safety reason of human eyes. It is not necessary that the group 42 be composed of three LEDs if the dispersion of the light strength from the lighting element group 42 is held within 10 percent in that scope.

In FIG. 2 and FIG. 3, the lighting unit 65 is disposed under an axle of a capturing light from the opening 63 to miniaturize the camera 60. In the actual image-input device, the location of the lighting unit 65 is determined subject to the following additional requirements; (a) the light dispersion is held within 10 percent in the scope that the image can be captured by the camera 60, (b) light reflected on the eye is not located on the iris in the eye, (c) light reflected on an eye glasses is not located onto the iris in the eyes, A visual light cut filter 31, which filters out the visual light element, is formed over the opening 63. The light passing through the filter 31 is led to a receptor surface of an image pickup device 33 such as a charge coupled device (CCD) through an optical unit 35 which is a combination of a plurality of lenses 32. That is, the iris image of the user, which is reflected by the half mirror 62, is fixated on the receptor surface of the image pickup device 33 through the filter 31 and the optical unit 35.

The fixated iris image is transformed into pixel data by the image pickup device 33, and then, the pixel data is transferred to an image signal output circuit 36 through a CCD drive circuit 34. The pixel data is transformed into an image signal by the circuit 36, and then the image signal is transferred to the PC 20 through a transfer cable 7 and a PC card 8 shown in FIG. 1. Referring to FIG. 3, the camera 60 is connected to the display 21 at a desired location of the screen edge 2a by a connector 66.

Figure 4:
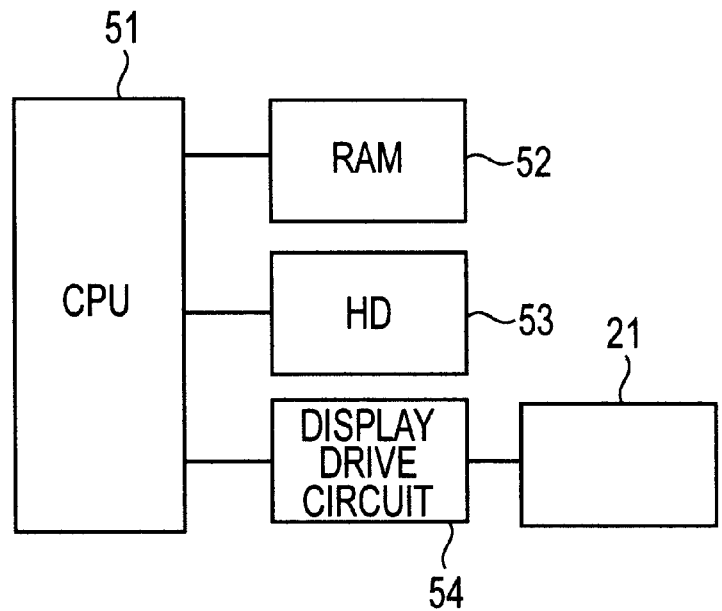
FIG. 4 is a block diagram of a control system in a notebook type PC.
Figure 5:
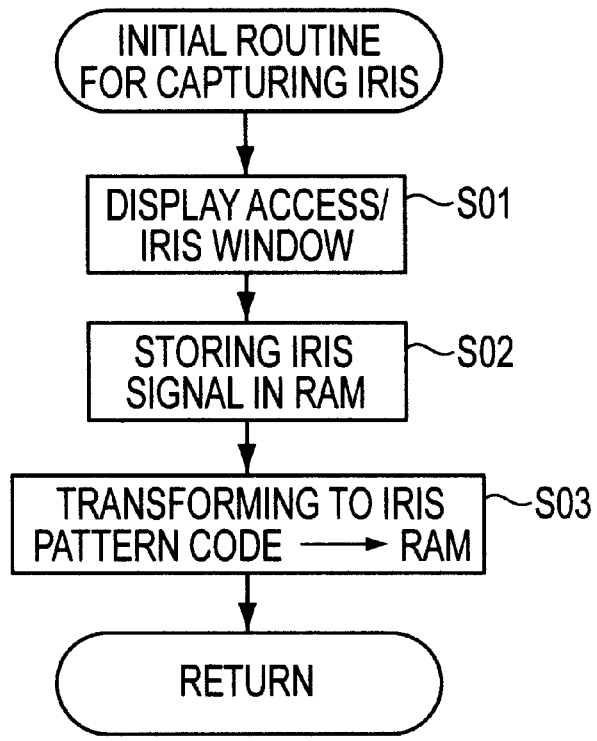
FIG. 5 is a flow chart showing an initial iris capturing routine.

Referring to FIG. 4, the PC 20 includes a CPU 51, a RAM 52 which is connected to the CPU 51, a hard disk (HD) 53 which is connected to the CPU 51, and a display drive circuit 54 which is connected between the CPU 51 and display 21. The CPU 51 controls the total operation of the PC 20. The captured image data is stored temporarily in the RAM 52 in response to the operation of the CPU 51. Security control software, provided in order to recognize individuals by iris patterns, is installed in the HD 53. The software is activated when the PC is turned on. After the activation of the software, an initial routine for capturing the iris image is carried out as shown in FIG. 5.

First, the display drive circuit 54 is operated by the CPU 51 to display both an access window 4 and an iris window 5 on the screen 3 of the display 21 (Step S01). In the iris window 5, an iris image which corresponds to the image signal transformed by the circuit 36, is displayed.

Next, the CPU 51 confirms whether or not an ENTER key 14 on the PC 20 is pushed until the CPU recognizes that the ENTER key 14 is pushed. During this confirmation process, the position of the center of the iris window 5 is adjusted by the user by following steps.

First, the camera 60 is fixed to the display 21 at such a location so as not to cause the user any stress when he/she watches the screen 3 through the half mirror 62 which is set at an angle of 45 degrees relative to the, screen 3. Then, the iris window 5 is moved by the user with the operation using a pointing pad 15 until the center of the half mirror 62 is positioned directly over the center of the iris window 5.

After this positioning operation is completed, the user should gaze at the center of the half mirror 62 with one of his/her eyes. Then, the camera 60 sends an image signal, which is transformed from the iris pattern captured by the camera 60, to the PC 20. An iris image based on the image signal is displayed in the iris window 5 on the screen 3. As described above, since visible light from the iris image of the user's eye, which is displayed in the iris window 5, passes through the half mirror 62, the user can watch the iris image in the iris window 5 through the half mirror 62. That is, the user's iris image which is captured by the camera 60 is immediately displayed in the iris window 5, and simultaneously, the user can watch the iris image in the iris window 5 through the half mirror 62.

Next, the user moves his/her face to adjust the focus of the image displayed on the screen 3 while he/she watches the image on the screen 3 through the half mirror 62. It is easy for the user to focus the image because the user can watch the image during the focusing. After the image on the screen is focused, the user pushes the ENTER key 14 of the PC 20.

If the ENTER key 14 is pushed, at least two frames of the image signal corresponding to the user's iris pattern, which are sent from the camera 60, are stored in the RAM 52 (Step S02). The image signal stored in the RAM 52 is transformed by the CPU 51 to an iris pattern code, from which it is easy to identify iris patterns, and then the iris pattern code is stored in the RAM 52 by CPU 51 (Step S03).

According to the above-described embodiment, the capturing of the iris pattern and the positioning of the iris image can be performed while the user is watching the iris image displayed on the screen 3 through the half mirror 62 without turning his/her eye away. In the above-described embodiment, since the hot mirror is used as the half mirror 62, the image on the screen becomes brighter when the user watches the image through the hot mirror. On the other hand, as the near infrared light area of the iris pattern is emphasized by the hot mirror, a fine iris pattern can be captured. Further, as the camera 60 is independent from the display 21, it is possible to miniaturize the image-input device. Furthermore, the capturing camera 60 can be, used as a regular camera by removing the half mirror 62.

Next, a process for registration of the iris image stored in the RAM 52 is explained below.

Figure 6:
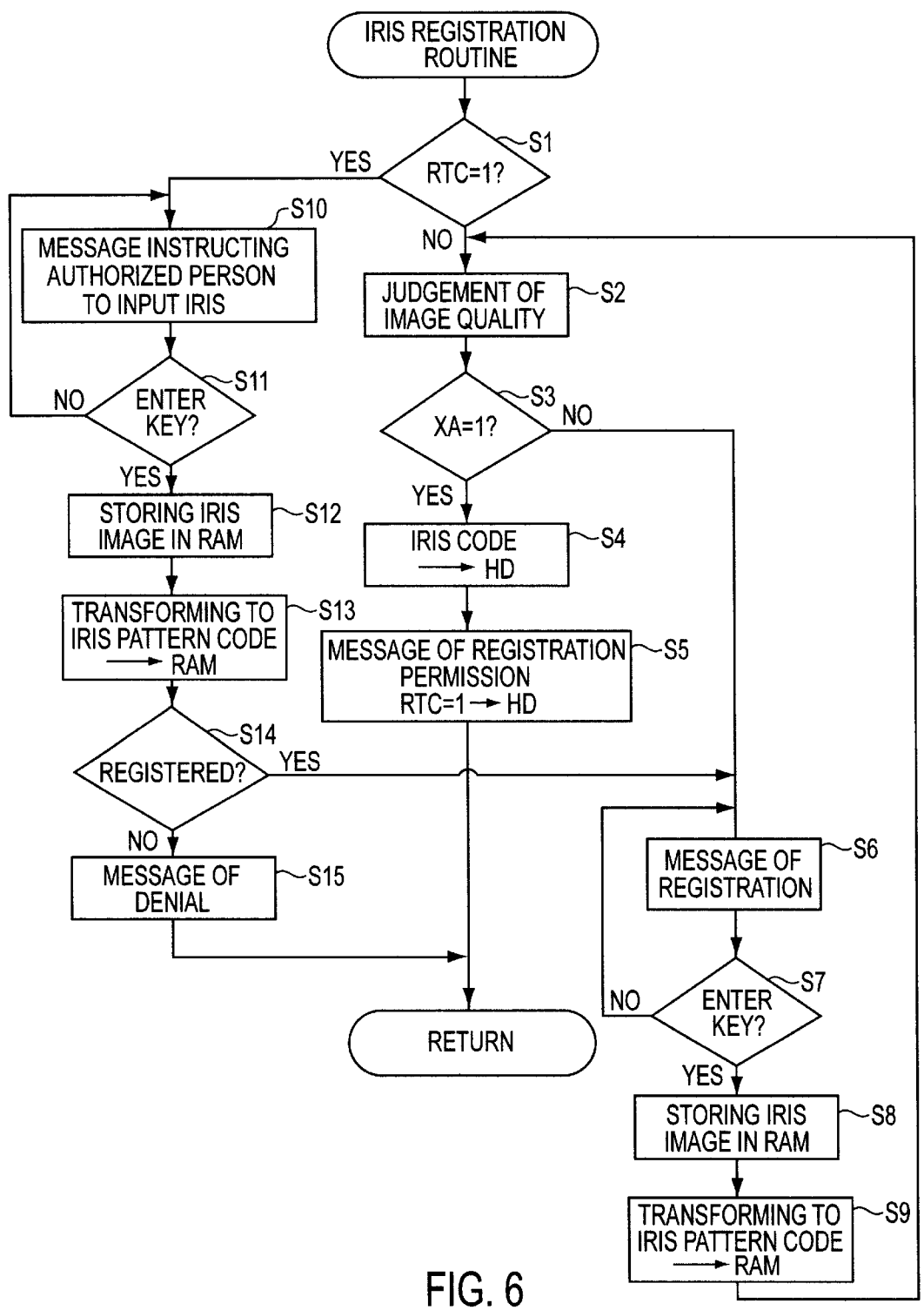
FIG. 6 is a flow chart showing an iris registering routine.

Referring to FIGS. 1 and 6, an access window 4 including an iris register icon 49 is displayed on the screen 3 when the PC 20 is turned on. If the user clicks the icon 49, the iris registering routine shown in FIG. 6 is performed by the CPU 51. The iris registering routine is explained below.

First, the CPU 51 determines whether or not this is the first registration request by the user. For the determination, the CPU 51 accesses a registration times code, which is stored in an iris registration area of the HD 53. That is, the CPU 51 judges whether or not the registration times code (RTC) shows "1" or more (Step S1). If the registration times code shows "0" which means that this is the first time of the registration, an iris pattern image quality judgement sub-routine is performed (Step S2). In this sub-routine, if the quality of the image stored as the iris pattern code is better than a reference image, an image quality signal XA having a logic level "1" is stored in an internal register of the CPU 51. To the contrary, if the quality of the image is worse than the reference image, an image quality signal XA having a logic level "0" is stored in the internal register of the CPU 51.

Next, the CPU judges whether the signal XA is "1"(Step S3). If the signal XA is "1", the CPU 51 instructs that the iris code pattern in RAM 52 should be registered in the iris registration area of the HD 53 (Step S4). Then, a message indicating "the registration is completed properly" appears on the screen 3 by instruction of the CPU 51. Simultaneously, the registration times code is changed to "1" by the CPU 51, and then, the registration times code having "1" is overwritten in the iris registration area of the HD 53 (Step S5).

If the signal XA is "0", another message indicating "You should register your iris again" appears on the screen 3 under the instruction by the CPU 51 (Step S6). Then, the CPU judges whether or not the ENTER key 14 is pushed (Step S7). If the ENTER key 14 is not pushed, then, step S6 is repeated. During the repetition, the iris pattern, is captured again by the above-described method. That is, the user moves his/her head again to adjust the focus, and the user pushes the ENTER key 14 when the iris image on the screen 3 is focused. If the CPU 51 confirms that the ENTER key 14 is pushed, the same operation of step S02 is performed (Step S8), and then, the same operation of step S03 is performed. (Step S9). If the step S9 is completed, then step S2 is repeated.

In accordance with steps S6 through,S9, a fine iris pattern.code can be stored in RAM 52 by recapturing the iris pattern even if the captured iris image is poor at first.

There are some occasions that the user wants to re-register his/her iris. In this case, when the user clicks the register icon, the following steps are performed. In step S1, as this is not the first registration, the registration times code shows "1". If the CPU 51 recognizes that the registration times code is "1", another message indicating "please call an authorized person" appears on the screen 3. The iris data of the authorized person has been registered in the HD 53. If this device is used in a bank, the authorized person would, for example, be a bank manager. The re-registration can be performed with cooperation from the authorized person. That is, first, the initial iris capturing routine shown in FIG. 5 is performed by the authorized person (Step S10), and then, the ENTER key 14 is pushed by the authorized person (Step S11). Next, the process for capturing the iris pattern of the authorized person (Step S12) and the process for transforming the iris image into the iris pattern code (Step S13) is performed by the above described method. Then the iris pattern code is temporarily stored in RAM 52 for comparison. This iris pattern code stored in RAM 52 is compared with the iris pattern code of the authorized person which is registered in the HD 53 (Step S14). If the CPU 51 recognizes these pattern codes to be identical, then the computer 20 allows reregister of the user's iris. That is, step S6 and the following steps are performed by the user. If the CPU 51 recognizes these pattern codes are not identical, then the message indicating "Re-registration is not allowed" is displayed on the screen 3 (Step S15).

Figure 7:
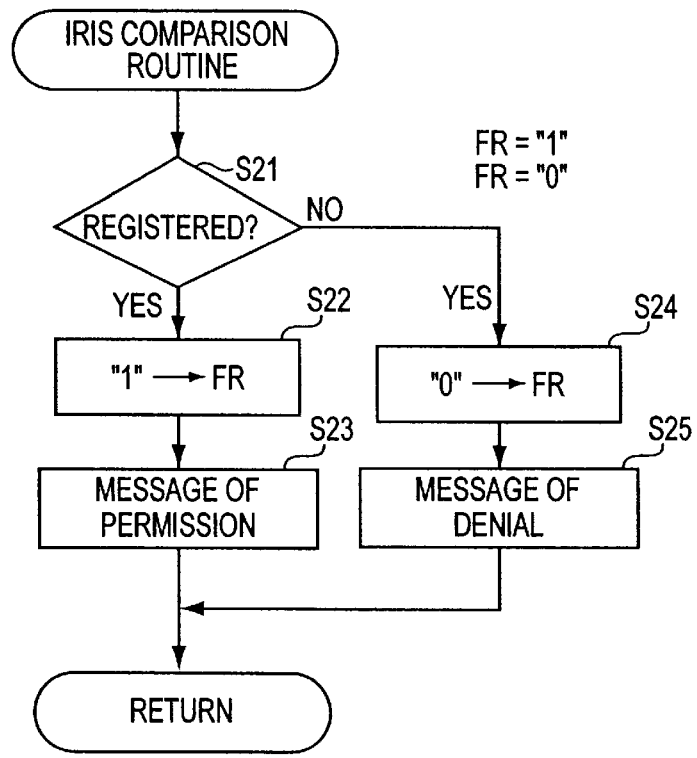
FIG. 7 is a flow chart showing an iris comparing routine.

Next, an iris comparing routine is explained. When the user clicks a menu appearing on the screen 3, to operate an application which is the object for the security, the iris comparing routine shown in FIG. 7 is performed before the application is performed.

First, it is judged by the CPU 51 whether or not the iris pattern code which is captured by the camera 60 exists in the iris registration area of the HD 53 (Step S21). If it is confirmed that the same iris pattern code is registered in the HD 53, a flag FR having a logic level "1", which means permission to use the application, is stored in a predetermined area of the HD 53 (Step S22). Then, a message indicating permission to use the application is displayed on the screen 3 (Step S23).

If it is not confirmed that the same iris pattern code is registered in the HD 53, the flag FR having the logic level "0", which means a denial to use the application, is stored in a predetermined area of the HD 53 (Step S24). Then, a message indicating the denial to use the application is displayed on the screen 3 (Step S25).

Upon completion of the step 23 or step 25, the iris comparing routine is ended. Therefore, as the application can be operated only when the flag indicates "1", a person whose iris is not registered can not access the application.

Figure 8:
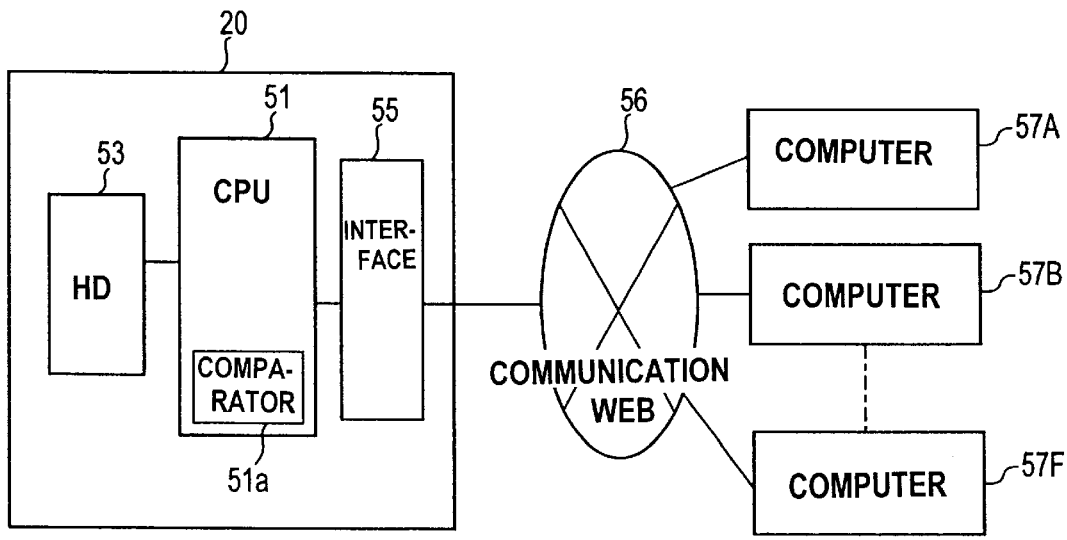
FIG. 8 is a system diagram showing a network to which the PC is connected.

Referring to FIG. 8, the PC 20 is connected to other computers 57A–57F through a communication web 56. The PC 20 includes the HD 53 which is connected to the CPU 51, and an interface 55 which is also connected to the CPU 51. The CPU 51 has a comparator 51a which performs the comparison described above. Referring to FIG. 1, an application which can access one of six computers 57A–57F is activated, and the six icons for selecting the computers 57A–57F to be accessed are displayed in the access window 4. The user can select one of the six computers 57A–57F by clicking the corresponding icon. If the CPU 51 recognizes that the flag shows the logic level "1", the right to access the computer which was selected by the user is established. If the CPU recognizes that the flag shows the logic level "0", the access right to the computer which was selected by the user is denied.

In the embodiment described above, the connector 66 is used for coupling the camera 60 to the screen edge 21a of the display 21. To adjust the location of the camera 60, the camera should be removed by loosening the connector, and then, couple it to the edge 21a again at the desired location. However, this is a troublesome work. The device shown in FIG. 9 resolves these problems.

Figure 9:
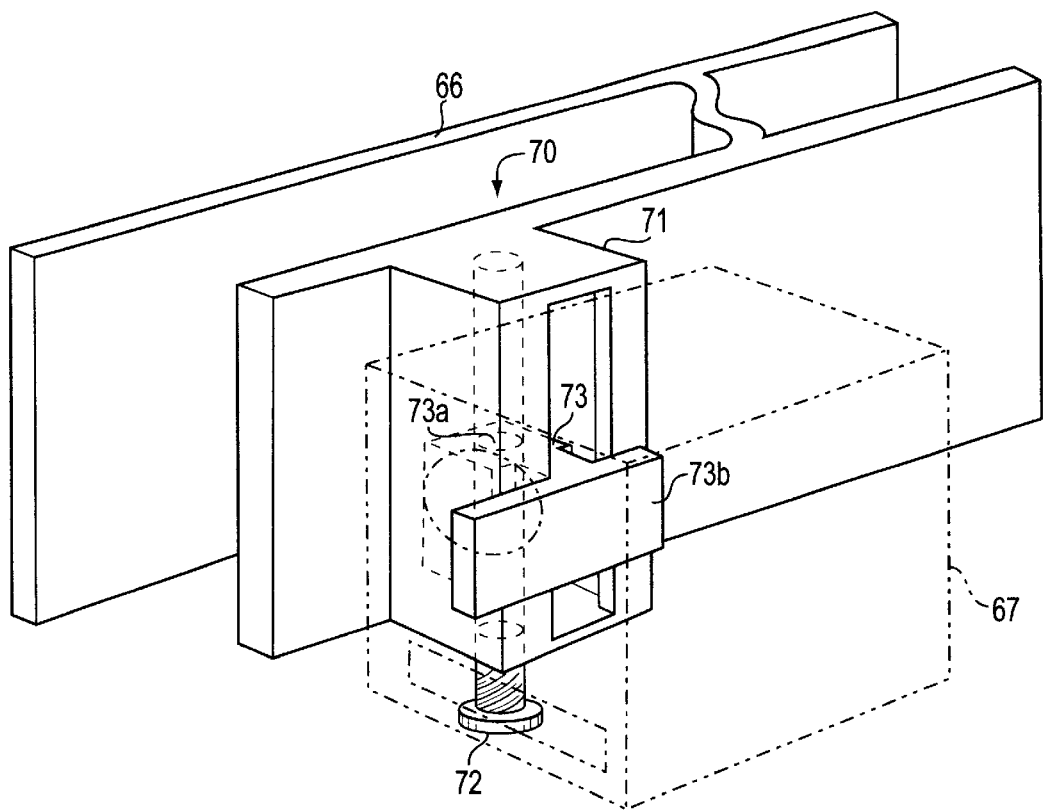
FIG. 9 is a perspective view showing an alternative connector of the invention.

In FIG. 9, the connector 66 includes a location adjustment mechanism 70. The mechanism includes a body 71 having an opening, a screw 72 and a movable body 73 having a hole 73a and a camera support 73b. The internal surface of the hole 73a is threaded. The screw 72 is inserted in the hole 73a. The peripheral of the hole 73a of the movable body 73 is located in the body 71, and the camera support 73b is located outside of the body 71 to hold the camera body 60. By rotating the screw 72, the movable body 73 can be moved up and down. As the camera body 67 is connected to the movable body 73b, the camera body 67 can also be moved up and down after the connector is coupled to the edge 21a.

Figure 10:
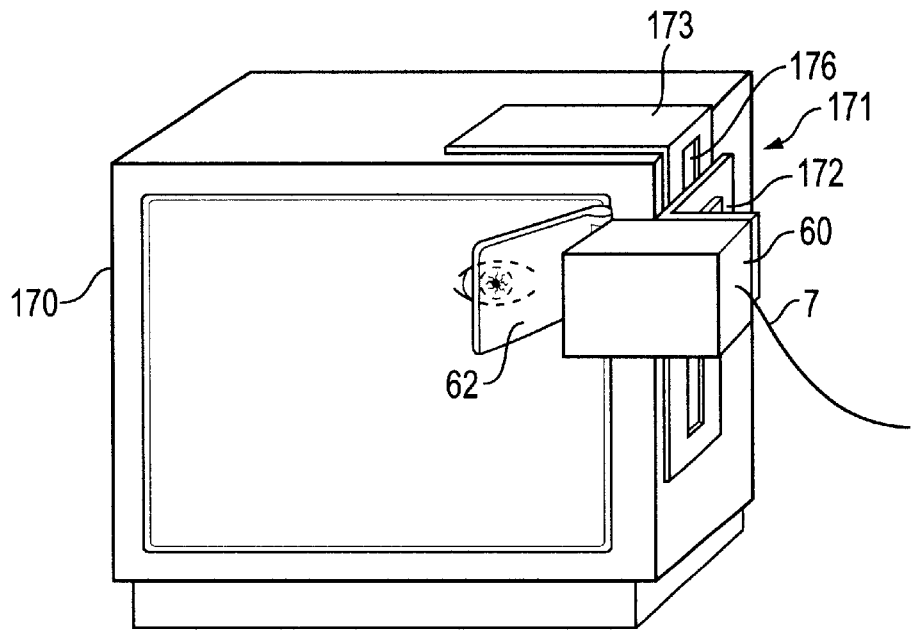
FIG. 10 is a perspective view of a desktop type PC to which the capturing camera is attached.
Figure 11:
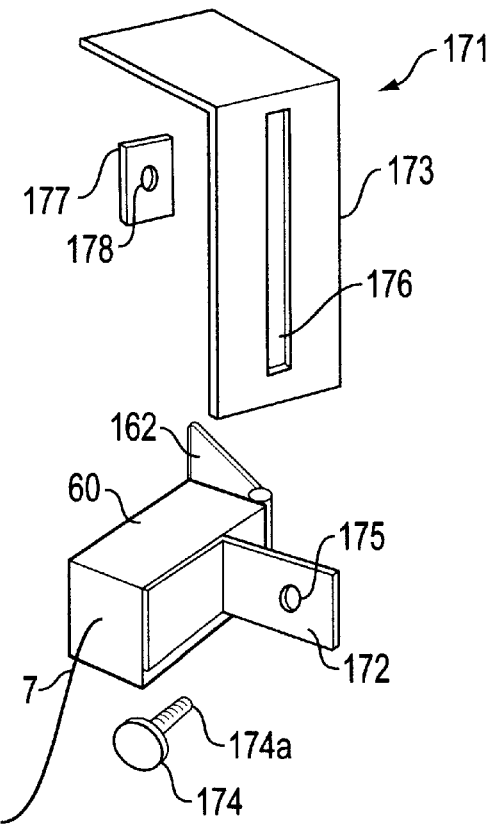
FIG. 11 is an exploded perspective view showing a connector which is used in FIG. 10.

In the embodiment described above, a notebook type PC is used. However, a desktop type PC having a CRT display can be used. In this case, the camera is coupled to the CRT display. Referring to FIG. 10, the camera 60 is attached to the PC 170 by a connector mechanism 171. The connector mechanism includes a large bracket 173 having an elongated opening 176, which is attached to the PC 170, and a small bracket 172 having an hole 175 for a screw 174, which is attached to the camera 60, and a plate 177 having a hole 178 for the screw 174. The width of the elongated opening is the same as or a little wider than the diameter of a shank 174a of the screw 174.

When the camera 60 is attached to the PC 170, the large bracket is attached to a body of the PC.170. The plate 177 is inserted between the large bracket and a side surface of the PC 170. The internal surface of the hole 178 of the plate 177 is threaded. Then, the screw 174 is inserted into the hole 175 of the small bracket 172 which is attached to the camera 60, and then, inserted in the elongated opening 176. Then, the shank 174a is inserted in the hole 177 of the plate 178. By tightening the screw 174, the camera 60 is attached to the PC 170. If the user wants to adjust the location of the camera 60, the user can loosen the screw 174, and then move the camera 60 up or down. Then, the user tightens the screw 174 again after the position of the camera is fixed.

Figure 12:
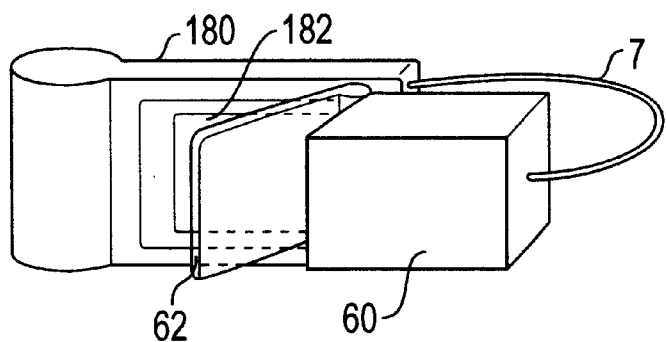
FIG. 12 is a perspective view of a mobile terminal device, to which the capturing camera is attached.

Further, it is possible to attach the camera to a mobile type terminal device. Referring to FIG. 12, the mobile type terminal device 180 includes an LCD display 182 and an interface. The data from the camera 60 can be sent to the mobile type terminal device 180 through the interface with the cable 7. The camera 60 is attached to the mobile type terminal device 180 by a connector which has the same structure as the connector 66 shown in FIGS. 1 and 3. The half mirror 62 is set at an angle of 45 with respect to the LCD display 182, and is disposed between the LCD display 182 and the camera 60. The iris image of the user which is captured by the camera 60, is sent to the mobile type terminal device 180, and then, the iris image is displayed on the screen of the display 182 for the adjustment of its location.

After the adjustment, the iris image is sent to a computer which is away from the mobile type terminal device 180 through a telephone line, or using, some other well-known telecommunication technology, for comparing the iris image with the iris data registered in the HD of the computer. The result of the comparison performed by the computer is sent to the mobile type terminal device 180, and is displayed.

The following explanation is of a typical example for the actual use of the mobile type terminal device of this invention. When a door-to-door salesman goes to a client or a possible client with the mobile type terminal device and the camera to sell or renew an insurance policy, this invention is very useful.

Before the door-to-door salesman goes to the client, an iris of the salesman should be registered in the HD of a host computer to allow access to software for drafting an insurance agreement. So, no one other than the salesman can access the software even if he loses the mobile type terminal device. After the salesman and the client agree to the insurance policy, the salesman attaches the camera to the mobile type terminal device. Then, the iris of the salesman is captured, and is sent to the host computer. If the host computer confirms that the iris of the salesman is identical to the registered data, then the software for drafting the insurance agreement is accessed.

Next, after the salesman drafts the agreement, the client's iris pattern is captured and registered in the host computer to record the contractor if the client satisfies the content of the insurance policy.

If the data regarding the insurance, agreement is sent to the host computer housed in a branch or headquarters of the insurance company, some processes confirming the client's personal history, including a crime history or other problems, are performed by authorized people in the company. If it is confirmed that there is no problem in the client's personal history, the insurance agreement between the company and the client is entered.

The invention can be used when paying an insurance money. That is, the salesman's iris and a beneficiary's iris are captured, and sent to the host computer for identification. If the computer confirms that the data of the salesman and the beneficiary which are sent from the mobile type terminal device are the same as the data which were stored in the host computer, the insurance money is paid.

Furthermore, this invention can be used at a reception desk in a hospital. A new patient normally presents his/her insurance card and a picture I.D., such as driver's license upon registering for a first medical examination. The registration can be performed by capturing the patient's iris pattern by the camera which is disposed on the desk, and then the patient's data is registered in a host computer in the hospital. At a second examination, the patient's iris is captured, and compared with the iris data registered in the host computer. So, it is not necessary for the patient to present anything to the hospital for the identification. This use is very useful for an emergency case, such as car accident. If the host computer is connected to the other computers in other hospitals, the patient can be identified in any hospital without any insurance card.

Figure 13:
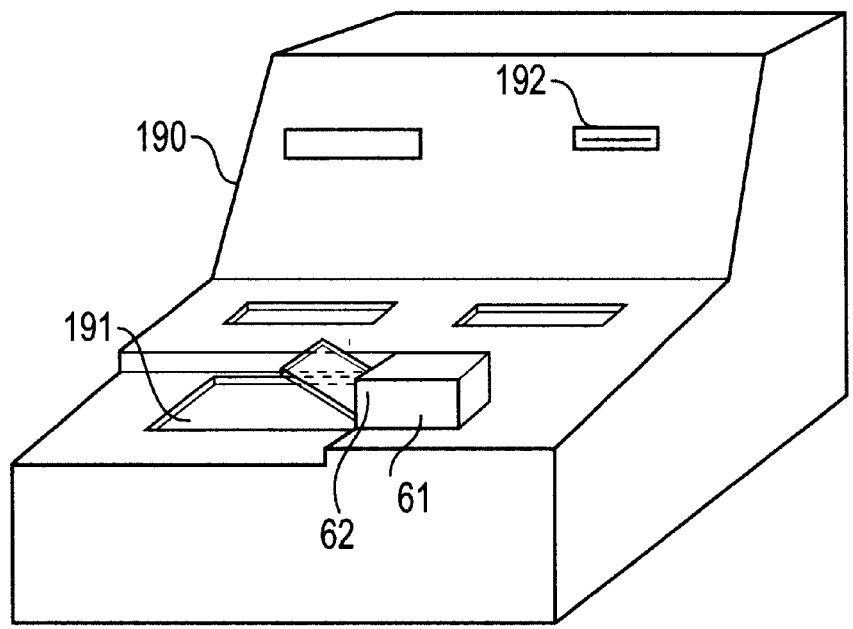
FIG. 13 is a perspective view of automatic transaction machine, to which the capturing camera is attached.

Furthermore, it is possible to attach the camera to an automatic teller machine (ATM) which is used in a financial institution. Referring to FIG. 13, the ATM 190 includes a touch panel display 191. The user can select one of various functions and input an amount of money, by touching the display 191. The camera 60 is fixed on the side of the display 191, and the half mirror 62, which is set at an angle of 45 relative to the display 191, is disposed between the display 191 and the camera 60.

In this embodiment, iris recognition is performed for identification of a user of the ATM 190. The user selects one of the functions displayed on the display 191 by touching the display 191, and inserts his/her card into a slot 192. Then, the user's iris is captured by the same method described above. The captured iris image is sent to a host computer in a bank, and is compared by the host computer. The result of the comparison is sent to the ATM 190, and the user is allowed to complete his/her transaction using the ATM 190.

Figure 14:
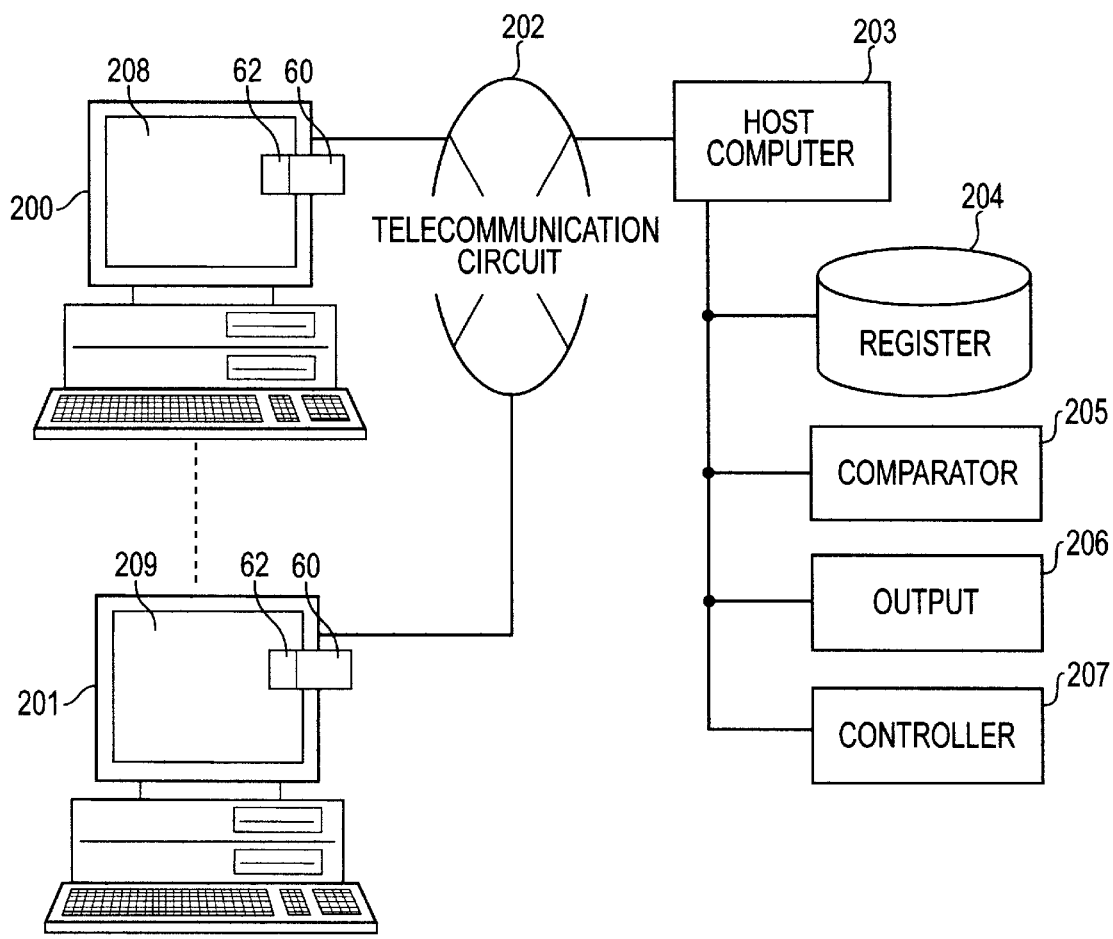
FIG. 14 is a system diagram of a plurality of terminal device, to which the capturing cameras is attached respectively.

Referring to FIG. 14, a plurality of terminal devices 200, 201 having a camera with a half mirror respectively are connected to a host computer 203 through a telecommunication circuit 202. The host computer 203 has a register 204 for storing iris data, a comparator 205 for comparing iris data, an output 206 for sending a result of the comparison to the terminal devices 200, 201, and a controller 207 for controlling the register 204. In this embodiment, each terminal device 200, 201 has features for capturing the iris data and for controlling a telecommunication to the host computer 203 through at least the circuit 202, and the iris registration or the iris comparison are performed in the host computer 203.

Each terminal device 200, 201 has a display 208, 209, a camera 60, and a half mirror, which is set an angle of 45 relative to the display 208, 209 and which is disposed between the display 208, 209 and camera 60. The captured iris data is sent to the terminal device 200, 201. Then, the data is sent to the host computer 203 through the circuit 202 by the terminal device 201, 202. The host computer 203 sends the data to the register 204 if the data should be registered, and the host computer 203 sends the data to the comparator 205 if the data should be compared. Then, the result of the comparison is output from the output 206.

The above-described embodiments are focused on capturing the iris. However, the invention can also be used for capturing other image, such as a barcode, a two-dimension barcode or a signature if the user can see the image through the half mirror which is set at an angle of 45 relative to the image and which is disposed between the image and the camera.

Figure 15:
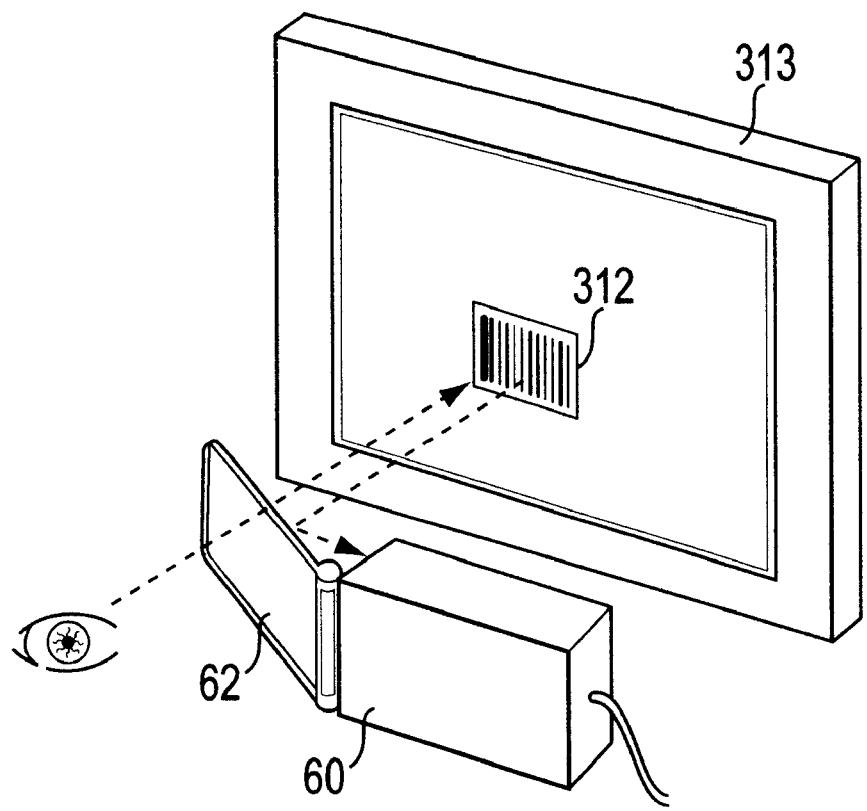
FIG. 15 is an illustration showing a barcode input device in which the image-input device of the invention is applied.

Referring to FIG. 15, the half mirror 62 which is set at an angle of 45 relative to a barcode 312 printed on a media 313, is disposed between the barcode 312 and the camera 60. The user can see the barcode 312 through the half mirror 62. The light from the barcode 312 is reflected to the camera 60. The registration of barcode pattern and the comparison of the barcode are performed by the process described above.

Figure 16:
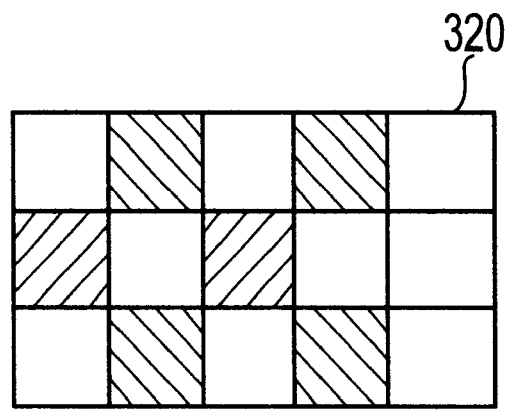
FIG. 16 is an illustration which is used for an explanation of a two-dimension barcode.

When the two-dimension barcode 320 shown in FIG. 16 is captured, it is necessary to capture the whole area of the barcode 320 Therefore, a CCD sensor which can read the two-dimension image, should be installed in the camera 60.

While the present invention has been described with reference to illustrative embodiments, this description is not intended to be construed in a limiting sense. Various modifications of the illustrated embodiments, as well as other embodiments of the invention, will be apparent to those skilled in the art on reference to this description. It is therefore contemplated that the appended claims will cover any such modifications or embodiments as falls within the true scope of the invention.

We claim:

1. An image-input device, comprising:

means for capturing an image of an object, a display for displaying the captured image, said display being independent from said capturing means;

an optical unit, disposed between the capturing means and said display, for passing a visible light element from the displayed image, and for reflecting near infrared light from the object to be input to said capturing means, and means for removably connecting said capturing means to an edge of said display wherein said optical unit is disposed between said display and said image of the object;

whereby a location of said capturing means at the edge of said display can be adjusted by releasing said connecting means from said edge of said display and by re-connecting said connecting means to said edge of said display.

2. An image-input device as claimed in claim 1, wherein the object to be input is an iris.

3. An image-input device as claimed in claim 2, further comprising:

a memory which registers data corresponding to an iris pattern, a comparator for comparing the registered iris pattern data with the iris pattern data captured by said capturing means, and network access means, responsive to an indication from said comparison that the captured iris pattern is the same as the registered iris pattern, for providing access to a network.

4. An image-input device as claimed in claim 3, further comprising a random access memory that temporarily stores the iris pattern data captured by said capturing means, due to compare with the registered iris pattern data.

5. An image-input device as claimed in claim 2, further comprising:

a portable terminal device, a random access memory that temporarily stores the iris pattern data captured by said capturing means, a memory storing software for registering an iris pattern data, a comparator for comparing the registered iris pattern data with the temporarily stored iris pattern data, means for activating the stored software if the registered iris pattern data is identical to the stored iris pattern data.

6. An image-input device as claimed in claim 1, further comprising a desktop-type personal computer, which is connected to said display.

7. An image-input device as claimed in claim 1, further comprising an auto teller machine which is connected to said display.

8. An image-input device, comprising:

means for capturing an image of an object;

a display device including a screen showing a window therein on which said image of the object captured by said capturing means is displayed;

an optical unit, disposed between the capturing means and said display device, for passing a visible light element from the displayed image, and for reflecting near infrared light from the object to be input to said capturing means, and a window mover, which gets said window moved on said screen of said display device, whereby a center of said window is aligned with a center of said optical unit.

* * * * *